United States Patent Office 3,803,305
Patented Apr. 9, 1974

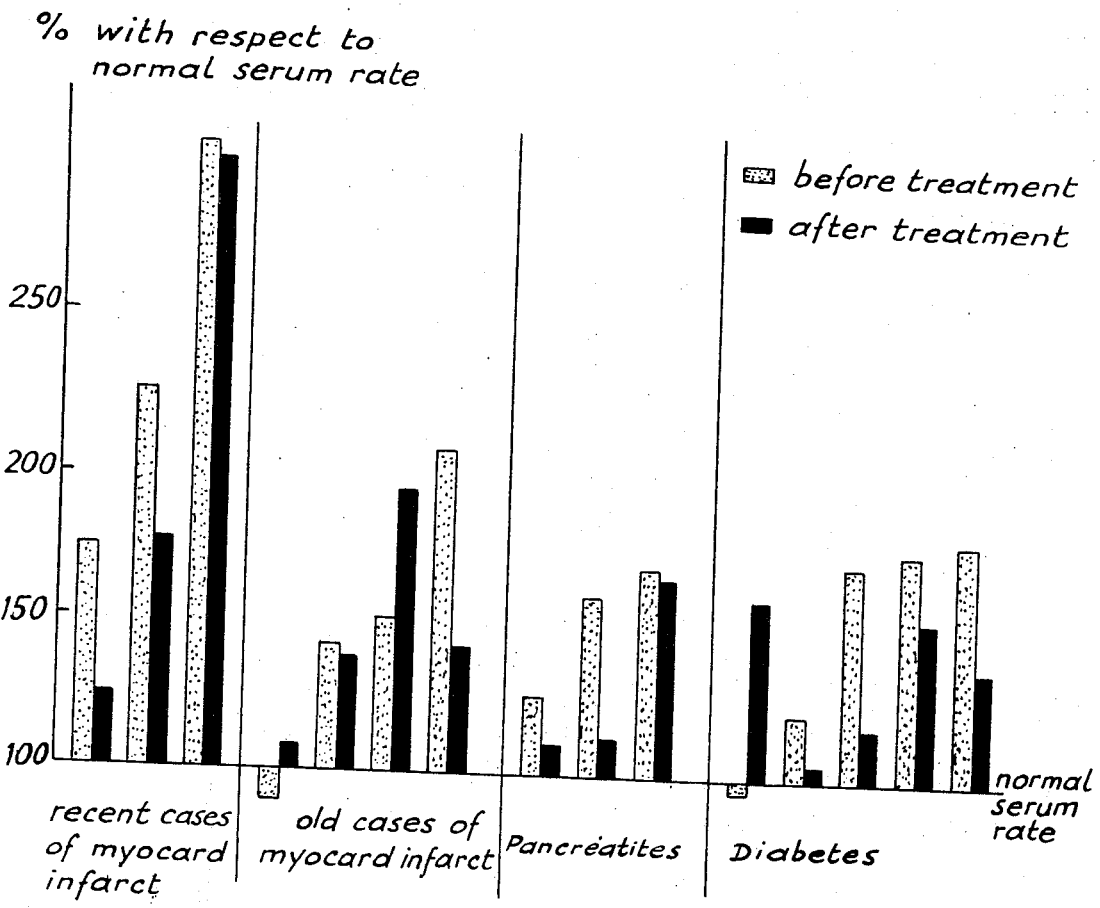

3,803,305
PROCESS FOR OBTAINING EXTRACTS
FROM PANCREAS
Yvonne Thuillier, Paris, France, assignor to Laboratories Albert Rolland, Paris, France
Continuation-in-part of application Ser. No. 863,696, Oct. 10, 1969, now Patent No. 3,676,551, which is a continuation-in-part of abandoned application Ser. No. 530,325, Feb. 28, 1966, which in turn is a continuation-in-part of abandoned application Ser. No. 247,827, Dec. 28, 1962. This application May 19, 1972, Ser. No. 229,272
The portion of the term of the patent subsequent to July 11, 1989, has been disclaimed
Int. Cl. A61k 17/08
U.S. Cl. 424—110       3 Claims

ABSTRACT OF THE DISCLOSURE

Extracts of animal pancreas, useful in opotherapy, are prepared by removing foreign matter, debris and fat from the aseptically collected pancreas immediately after slaughtering the animal. The remainder is then very rapidly frozen to about a temperature of −78° C. and maintained at a temperature of about −20° C. Thereupon, the pancreas is crushed at a temperature of about 2° C. and subjected to moderate digestion at room temperature by activated trypsin. Upon removing insoluble matter a clear solution is obtained. Euglobulins present in the solution are removed by adsorption on an insoluble sulfate which is then removed by filtration, and the resulting solution is clarified. Finally, the clarified solution is rapidly freeze-dried at a temperature of about −80° C.

SPECIFICATION

This application is a continuation-in-part application of my copending application Ser. No. 863,696, filed Oct. 10, 1969, now Pat. No. 3,676,551 which is a continuation-in-part application of my appication Ser. No. 530,325, filed Feb. 28, 1966, and now abandoned, which in turn is a continuation-in-part application of my earlier filed application Ser. No. 247,827, filed Dec. 28, 1962, and now abandoned.

This invention relates to pancreas preparations and is particularly directed towards a new and improved process for preserving the active principles contained in tissue from pancreas, and for making them anallergic for physiological and therapeutic purposes.

BACKGROUND

The prior products obtained from the pancreas were characterized by notable deficiencies, due to the degrading effects of the methods used in the preparation thereof. These prior methods resulted in modification or even elimination of essential components of the active principles contained in the starting materials, essentially due to the following:

(1) Autolysis of the material;
(2) The use of aqueous-alcoholic, alcoholic, acetonic and similar vehicles, as well as heating in acidic media for precipitating the proteins;
(3) Tyndallization (heating at 70° C. for three days) or autoclaving (heating for one hour at 120° C.) to sterilize the product;
(4) Preservation in an aqueous medium, as a consequence of which the active principles underwent degradation or modification.

Furthermore, there is no doubt that substances are produced by each tissue of a normal organism, some of which are known, whilst others are still unknown, the metabolic activity of each substance depending on the constitution of the tissues, so that it is in fact impossible to identify precisely in general the active principles of an opotherapic extract. (Thuillier, "Active Principles of the Hepatic Gland and Their Functional Relations—General Interest of Hepatotherapy," published in Praxis, No. 31, Aug. 1, 1957, pages 676–681.)

It is thus essential that the composition of these complete opotherapic extracts be similar to the composition of the fresh organ, and that during their preparation these extracts undergo the least possible degradation.

Another essential problem in the manufacture of products containing active principles of animal organs, intended for injection, is the sufficient elimination of specific heterogeneous proteins, equally contained in the starting material. When specific proteins of an animal or a determined organ are injected into the human organs, detrimental phenomena arise, such as anaphylactic shocks and seroreactions, e.g., urticaria and allergy. The presence of these proteins in products obtained by the above-described methods thus renders the useful application of the thus preserved active principles impossible.

THE INVENTION

The instant invention overcomes the aforesaid disadvantages of the conventional methods by maintaining the active principles of the pancreas in their natural physiological equillibrium.

The basic operations involved in producing the products of this invention are the following:

(1) Quick freezing to about −78° C. of the pancreas under sterile conditions immediately after aseptic removal thereof from the freshly slaughtered animal.

(2) Effecting a digestion with elimination of the antigenic activity of the material so as to render same non-allergenic.

(3) Freeze-drying of the material rendered non-allergenic.

All process steps described hereinbefore are carried out under sterile conditions, thereby avoiding the necessity for subsequent sterilization of the final pancreatic preparation.

By means of the process according to the invention the integrity of the cellular content of active principles is maintained in its natural physiological equilibrium, which is achieved more particularly by the stabilizing action of the cold temperatures which are maintained during each step of the preparation.

Moreover, the process according to the invention is also carried out under the following conditions:

the cells of the pancreas are still living (from a biological point of view), and no dead or mortified organs are employed. The organs are taken aseptically from selected young animals (e.g., from steers which are less than two years old);

during preparation, the use of heat is avoided and the addition of such solvents or other substances as are capable of destroying certain active principles is also avoided. Thus, during the entire process the prevailing temperature never exceeds room temperature;

preservation is obtained by freeze-drying. The activity of the fragile cellular constituents which had been successfully protected from a loss up to this stage is thereby preserved.

Furthermore, it is the object of the present process to obtain complete extracts whose content of therapeutically active principles corresponds to the one of the starting material, as regards their nature and their proportions, which extracts, moreover, do not show any antigenic action, so that they may be injected into humans without danger.

The process of the invention is based on the following experimental findings: the antigen contained in the pseudo-globulins and euglobulins is completely adsorbed by barium or calcium sulfate; the pseudo-globulins and euglobulins are freed from the mass by means of a moderate cleavage of the protein; and the antigenic power is thus eliminated by means of adsorption on barium sulfate.

Theoretically, the advantageous results of the novel process according to the invention are in conformity with recent discoveries made during physico-chemical studies on enzymes (Heidelberger, "Contribution of Immuno-Chemistry to the Study of Biological Structures," published in Bulletin de la Societe de Chimie Biologique, 1964, vol. 46, No. 11, pp. 1293–1298), according to which it is possible to maintain the enzymatic activity of proteic elements when their immunologic activities are different. In proceeding with special caution it is thus possible to preserve the fraction of the active principle of the protein which is of interest, and simultaneously to eliminate the antigenic site.

FLOW DIAGRAM OF THE PROCESS ACCORDING TO THE INVENTION

Starting material: Pancreas removed aseptically promptly after slaughter;
Quick freezing to —78° C.;
Transport to laboratory in refrigerated containers held at —20° C.;
Mechanical crushing;
Crushings digested at ambient temperature by the action of trypsin, activated with calcium ions, and clarified;
pH of clarified liquid reduced to pH 3.7 with $H_2SO_4$;
pH released to pH 9 by addition of $Ba(OH)_2$ or $Ca(OH)_2$ resulting in precipitation of insoluble sulfate with euglobulin affixed thereto;
Precipitate removed and liquid clarified;
pH of liquid reduced to pH 3.7, and clarified;
Liquid quickly frozen to —80° C.;
Freeze-dried, plate temperature —80° C.; and under a vacuum of $10^{-4}$ mm. Hg;
Final product.

The process of the invention is applicable to the preparation and preservation of physiologically active materials from pancreatic tissue obtained from any kind of animal. Preferably, mammals such as pigs, sheep and bovine animals or their fetuses in the later stages of development are used.

The tissues of pancreas is collected aseptically at the time of slaughtering, and is freed from foreign portions and various debris (fat) and frozen very quickly to a low temperature, preferably about —78° C., this being done in order to avoid any autolysis or fermentation phenomena. The constituents of the cell are thus preserved without degradation.

The organs are crushed in a mechanical crusher in order to obtain a maximum surface effect and to simultaneously free the cellular content.

The crushed material is rendered anallergic in two stages:

(a) Moderate cleavage of the proteins by activated trypsin; specific euglobulins are left in the mass;
(b) Fixation of euglobulins on an insoluble sulfate.

After the disintegration by calcium-activated trypsin, the pH of the exact is first brought to 3.7 with sulfuric acid and then to 9 by the addition of barium or calcium hydroxide, at a temperature not exceeding room temperature. The fluid mass is stirred to cause complete precipitation of the insoluble sulfate which carries down with it the euglobulins which have been adsorbed thereon.

After complete precipitation of the sulfate with the euglobulins adsorbed thereon, and removal of the precipitate, the residual solution is freeze-dried.

The ampoules containing the material are frozen in a drying chamber, cooled to —80° C. (the freezing point of the material being within the range of from —10° C. to —15° C.).

During the drying step under reduced pressure the temperature of the plate is kept at —70° C. to —80° C., and the temperature of the cold condenser is maintained within the range of from —90° C. to —100° C. The pressure of the order of $10^{-4}$ mm. Hg.

The freeze-dried product is obtained as a powder, which can be dissolved in a pyrogenic distilled water to form an injectable solution.

The above-described process of the present invention is set forth in specific illustrative embodiments in the following example.

EXAMPLE (a) First operation.—Aseptic separation with quick freezing

The starting material is 1–12 kg. of pancreas, collected from steers less than two years old. Freezing to —78° C. is effected immediately after slaughtering. Each batch of pancreas collected under sterile conditions is transported to the laboratory in refrigerated containers held at —20° C.

(b) Second operation.—Mechanical crushing

Just before crushing, the pancreases were thawed in their containers by subjecting the containers to a temperature of +2° C. for 12 hours, after which, while still under sterile conditions, they were put through the crusher. The crushed organs were collected.

Cleavage of protein molecules

Sterile lime water was added to the crushed organs. The pH was adjusted to about 8 by adding 1 N NaOH with continual stirring. Then trypsin solution, sterilized on an $EKS_2$ sterilizing filter, in a ratio of 3 parts of pure trypsin to 100 parts by weight of fresh pancreas was added, and the mixture kept for 5 hours at ambient temperature to effect digestion which was considered to be terminated when the pH reached about 4.6–4.7. The solution was filtered, e.g., over a nylon cloth and then clarified by centrifuging. The solution was kept overnight at —5° C.

Elimination of antigenic globulins

The solution was acidified by adding sulfuric acid at a dilution ratio of 1/7 by weight, until the pH reached 3.9.

Pure barium hydroxide was then added until the pH reached 9. An abundant precipitate formed.

After standing for at least one hour the suspension was centrifuged until a perfectly clear liquid was obtained. If necessary, the liquid may be filtered over $C_2$. The pH was then brought to 3.7. The liquid was again centrifuged and further clarified by filtration. The absence of barium was checked by using sulfuric acid at a dilution ratio of 1/7 by weight on a fraction of the liquid. The dry extract should be controlled and should amount to 10% of the liquid. The solution, which should have a pH of from 4.2 to 4.5 was filled into sterile ampoules, each containing 2.5 ml. of said solution.

(c) Third operation

The ampoules were frozen by being placed immediately in a sterile drying chamber, cooled to —80° C. (Freezing point of the product within the range —10° C. to —15° C.) Rapid freezing took place in a few seconds.

Drying took place in a drying chamber provided with glass windows, which was cooled by circulation of alcohol and PRSON–13. Temperature of the plates was maintained within the range of from —70° C. to —80° C., and that of the cold condenser within the range of from −90° C. to −100° C. The use of said condenser and of a blade-type rotary pump permitted the vacuum to reach an order of about $10^{-4}$ mm. Mg.

Towards the end, the operation was carried out in an inert atmosphere (nitrogen) to avoid any oxidation.

During the freeze-drying step the product never reached a temperature exceeding 0° C.

The extract contains tissue hormones, callicrein, vagotonin and other principles present in the pancreas. It is a white powder with total N, 10–11%; amino N, 7–8%.

A qualitative analysis of the free and combined aminoacids shows that the composition is similar to that of the fresh organ. The absence of antigenic substances is controlled by the Gucterlony method. The product has no allergenic effect. Considerable amounts of desoxyriboncleic acids, organic phosphorus and pentoses are present.

PHARMACODYNAMIC STUDY

Numerous anatomo-clinical, biological and experimental observations which lead to the conclusion that the pancreatic secretions play an important role in the lipoprotein balance of the serum and in the integrity of the vascular walls (J. Arnal, "Atherosclerosis and Pancreatic Secretions," thesis for doctorate in medicine 1966, Paris), have prompted a study of the influence of the pancreatic extract of the present invention on the evolution of the experimental arterial lesions.

The process of study chosen was the experimental cholesterolic atheroma in the rabbit (P. Gendre; Compt. Rend. Soc. Biol. 162, 412–413 (1968). The atheroma is provoked by subjecting the rabbits, for three months, to a high cholesterol diet composed of a normal diet for rabbits (U.A.R.), plus oil of maize (6%), and cholesterol (2%).

(a) Effect of the pancreas extract on cholesterolemia and on lipemia.

32 rabbits with an average weight of 1.5 kg. were distributed in three groups:

Group A: 12 rabbits receiving the high cholesterol diet;
Group B: 12 rabbits receiving the high cholesterol diet and in addition, each day by I.M. route, 50 mg. of pancreas extract of the present invention per kg. of body weight;
Group C: 8 rabbits receiving only the normal diet (UAR).

Every two weeks, the following determinations were made in the serum:

Total cholesterol (method of Pearson, Stern and Mc-Gavack)
Total lipids (method of Chabrol and Charonnat)
Esterified fatty acids (method of Stern and Chapiro).

The results obtained were as follows:

In the animals of Group A, receiving the high cholesterol diet, the serum level of total lipids, of total cholesterol and of fatty acids increase during the course of the study and reach, after twelve weeks, the values indicated in the following table. In the animals of Group B, the increase is clearly less high, and the differences of the averages between the two groups of rabbits remain significant for all the biological examinations made after three months of atherogenic diet, as indicated in the following table:

| | Average of the serum rates after twelve weeks of atherogenic diet | | |
|---|---|---|---|
| | Control (Group A) | Treated (Group B) | Significance |
| Total lipids (g./liter serum). | 58.4 | 44.3 | $0.01 < P < 0.02$ |
| Total cholesterol (g./liter serum). | 27.7 | 20.8 | $0.01 < P < 0.02$ |
| Esterified fatty acids (meq./liter serum). | 66.0 | 55.4 | $0.001 < P < 0.01$ |

The administration to rabbits on an atherogenic diet of the pancreatic extract of the present invention reduces very considerably the increase of the levels of lipids, cholesterol and esterified fatty acids in the serum.

(b) Effect on the retention of triolein and cholesterol marked with 14 C. in the wall of the aorta After three months of high cholesterol diet, the animals of each group (A, B, C) were distributed in two batches with the same number of animals in each, and each animal of each of these batches received by I.V. route either 0.25 mg. of a solution of $^{14}C$-triolein $39\mu$ curies) in Labrafil M 1944 (polyoxyethylene oleic glycerides).

The 32 rabbits in the experiment were thus distributed in 6 groups:

Group $A_1$: 6 rabbits receiving $^{14}C$-triolein;
Group $A_2$: 6 rabbits receiving $4\text{-}^{14}C$-chloesterol;
Group $B_1$: 6 rabbits receiving $^{14}C$-triolein;
Group $B_2$: 6 rabbits receiving $4\text{-}^{14}C$-cholesterol;
Group $C_1$: 4 rabbits receiving $^{14}C$-triolein;
Group $C_2$: 4 rabbits receiving $4\text{-}^{14}C$-cholesterol.

All the rabbits, fasting since the injection, were then sacrificed 24 hours after the administration of the products marked with $^{14}C$, and three different parts of the aorta were immediately removed (the arch of the aorta, 3 cm. of thoracic aorta and 3 cm. of abdominal aorta).

The fragments of aorta were dissected and washed in physiological salt solution and then examined histologically under the microscope. Then they were dissolved in hydroxide of hyamine for 48 hours and kept at 60° C. in order to measure the activity with the aid of IDL scintillation spectrometer, in liquid medium. After cooling, an accurately weighed aliquot of the hyamine extract was introduced into a counting flask, with 10 ml. of the scintillating "Kinard" solution.

The different activities expressed in counts per second are given in the following table, in percent of the activity injected, per cm. of aorta for the thoracic and abdominal aorta and per mg. of dried aorta for the arch of the aorta.

| | Thoracic aorta (3 cm.), activity/cm. percent injected activity | | Abdominal aorta (3 cm.), activity/cm. percent injected activity | | Arch of the arota, activity/mg. of dried aorta percent injected activity | |
|---|---|---|---|---|---|---|
| | Cholesterol 4-C 14 | Triolein C 14 | Cholesterol 4-C 14 | Triolein 4-C 14 | Cholesterol 4-C 14 | Triolein C 14 |
| Normal controls (batch C) [1] | $0.19 \cdot 10^{-3}$ | $0.18 \cdot 10^{-3}$ | $0.20 \cdot 10^{-3}$ | $0.18 \cdot 10^{-3}$ | $0.29 \cdot 10^{-4}$ | $0.23 \cdot 10^{-4}$ |
| Controls (batch A) after three months of atherogenic diet [2] | $0.18 \cdot 10^{-3}$ | $0.70 \cdot 10^{-3}$ | $0.77 \cdot 10^{-3}$ | $0.46 \cdot 10^{-3}$ | $0.93 \cdot 10^{-4}$ | $0.44 \cdot 10^{-4}$ |
| Treated (batch B) after three months of atherogenic diet [2] | $0.55 \cdot 10^{-3}$ | $0.43 \cdot 10^{-3}$ | $0.46 \cdot 10^{-3}$ | $0.23 \cdot 10^{-3}$ | $0.55 \cdot 10^{-4}$ | $0.34 \cdot 10^{-4}$ |

[1] Average of 4 animals for each marked product injected.
[2] Average of 6 animals.

These results show that the transfers of triolein, and especially of cholesterol into the wall of the aorta are considerably increased with respect to the normal (batch C) and for the animals having received the atherogenic diet (batch A), for three months, but that this increase in the transfer of triolein and cholesterol is significantly less in the animals receiving at the same time the pancreas extract of the present invention (batch B).

At the same time, a histological examination shows that the administration of the pancreas extract of the present invention acts to reduce the thickening of the arterial wall.

BIOLOGICAL AND CLINICAL STUDY

This study has shown that the pancreas extract of the present invention is very effective in the treatment of arterial diseases, pancreatitis and non-insulin dependent diabetes.

It is well known at present that atherosclerosis comes from a disfunctioning of the pancreatic enzymes which control the metabolism of the arterial wall.

A number of auhors, including Mr. Perrault ("Atherosclerosis and Pancreatic Secretion"; Coll. Prog. Med. 1967, 95, pp. 335–345) and B. Goodhead ("Vascular Factors in Acute Pancreatites"; The Lancet, October 18, 1969, pp. 830–831) have emphasized the importance of the atheromatous lesions of the arterial network in the course of chronic pancreatitis, as well as the frequent association of coronary thrombosis and acute pancreatitis.

Atherosclerosis is associated with a disturbance in the metabolism of lipids and cholesterol, transported in the blood and solubilized under the form of slow and rapid lipoproteins. A disturbance of pancreatic lipases and cholesterol-esterases liberate lipides and cholesterol which deposit and form atheroma plaques. A biological and clinical study has shown that the pancreas extract of the present invention contains the essential enzymatic factors which regulate lipo-protein disturbances in patients suffering from arterial diseases, coronary insufficiencies and pancreatitis.

It is known that a disfunction of certain enzymic systems of pancreatic origin (elastase and collagenase) occurs in the alteration of the elastic fibers and the depolymerization of the mucopolysaccharides of the collagen forming the arterial tissue. The biological and clinical study made in a number of cases of arterial diseases has shown that the pancreas extract of the present invention has a role in controlling the elastase-antielastase complex and thus enables the disturbances which provoke or favor the arterial hardening and the thickening of arterial wall to be corrected or stabilized.

(a) Role of regulator of the pancreas extract of the present invention on the lipoproteins of the serum (which are the circulating form of lipids and cholesterol)

A study of the serum conveyors, slow and rapid lipoproteins, was made in patients before and after treatment.

By this means, one can obtain a picture of the dynamic interaction of the enzymes and antienzymes of pancreatic origin in the metabolism of the lipids and correlatively of the carbohydrates.

A study of more than 400 sera by the immunoelectrophoretic method has disclosed the existence of two groups of lipoproteins: the more mobile lipoproteins or group "$\alpha$," the lipoproteins of slower mobility or group "$\beta$."

By immunoelectrophoretic analysis according to the Scheidegger method (Burtin P., The Proteins of Normal Human Plasma, chapter 5, Immunoelectrophoretic Analysis, edited by P. Grabar and P. Burtin, Amsterdam Elsevier Publishing Company, 1964, p. 120) in veronal agar-agar at 1.5%, pH 8.2, and after dyeing by the Soudan W, the soudanophile precipitation arcs corresponding to the two enumerated groups are observed.

The lipidographs, which include slow ($\beta$) and rapid ($\alpha$) lipoprotein rates and the ratio $\beta/\alpha$ have been determined by immunoelectrophoretic analysis on the serum of patients, before and after treatment with the pancreas extract of the present invention.

The patients subjected to the treatment presented the following ailments:

(1) Coronary insufficiencies
(2) Arterial diseases: atheromatosis, arteriosclerosis
(3) Subacute and chronic pancreatitis (hepatopancreatic mass)
(4) Miscellaneous (obesity, considerable astenia, alteration of the general state).

The duration of the treatment by injections from 1 to 2 ampoules (each containing 200 mg. of pancreas extract of the present invention diluted in 5 ml. of solvent at time of use) per day for 20 days was a function of clinical improvement.

RESULTS

The results of the lipidographs of some standard cases have been shown in block tables (Table I: arterial diseases; Table II arteritis of this lower limb; Table III pancreatitis, diabetes; miscellaneous).

Out of the 30 cases of patients treated with the pancreas extract of the present invention, the modifications of the lipidograph were excellent in 3 cases, very good in 13 cases, good in 9 cases, fairly good in 1 case and mediocre in 4 cases.

The rate of beta liproproteins was reduced to the benefit of the rate of alpha lipoproteins; the ratio of the beta/alpha rate tended to be regulated, i.e., to reconcile the normal serum ratio: 2,4.

On the other hand, the patients thus treated by the pancreas extract were clinically improved.

(b) Role of regulator of the pancreas extract according to the invention on the elastase-antielastase complex, in the arterial pathology (hardening of the artery)

The pancreas, which is the gland of the lipogenesis and of the lipolysis due to its enzymatic secretions (particularly lipases, proteases (and esterase) is also the gland of the regulation of the elasticity of the artery by means of the elastase that it secretes.

The elastase has been discovered by two Hungarian authors: S. Balo ("On the History and Pathogenisis of Atherosclerosis"; Geront. Geriat. section XX of Excerpta Medica 1959, 2, 279–283) and I. Banga ("Isolation and Crystallisation of Elastase From Pancreas of Cattle"; Acta Physiol. Acad. Sci. Hung. 1963, 24, 1).

In the course of recent studies, Perrault ("Biological Role of the Elastase"; Pathologie Biol. 1969, vol. 17, pp. 317–326) has shown that, in the serum of patients suffering from atherosclerosis, there is an increased antielastase activity, whilst the elastase activity is often diminished, particularly in chronic cases where pancreatic secretions are reduced.

In the course of a clinical study on 53 patients suffering from atherosclerosis, the pancreas extract of the present invention was administered to such patients:

By parental route at a rate of 1 or 2 I.M. injections per day, of 200 mg. of active ingredient dissolved in 5 ml. of solvent at the moment of use, for 10 to 330 days;

By oral route, for treatments lasting several months, in the form of dragées containing 100 mg. of active ingredient.

The results are given in FIG. 1, 2 and 3 which show the percentages of increase (or reduction) of the rates of antielastase and elastase with respect to the rate, established at 100%, of these enzymes in the normal human serum, firstly before treatment, second after treatment with the pancreas extract.

FIG. 1 shows the variations of the rate of anti-elastase in the sera of 38 atheromatous patients distributed as follows:

9 cases of atherosclerosis in elderly persons
5 cases of arteritis in lower limbs
12 cases of right or left hemiplegia
12 cases of coronary insufficiency, vascular thrombosis and hypertrophy and ventricular overload.

FIG. 3 shows the variations of the rate of anti-elastase in the serum of:

3 recent cases of coronary thrombosis
4 former cases of coronary thrombosis
3 cases of pancreatitis
5 cases of diabetes.

The results are all the more significant as it was a question of patients whose arterial disorder had been discovered on the occasion of patent and severe manifestations of the atheromatous illness.

Figure 1:
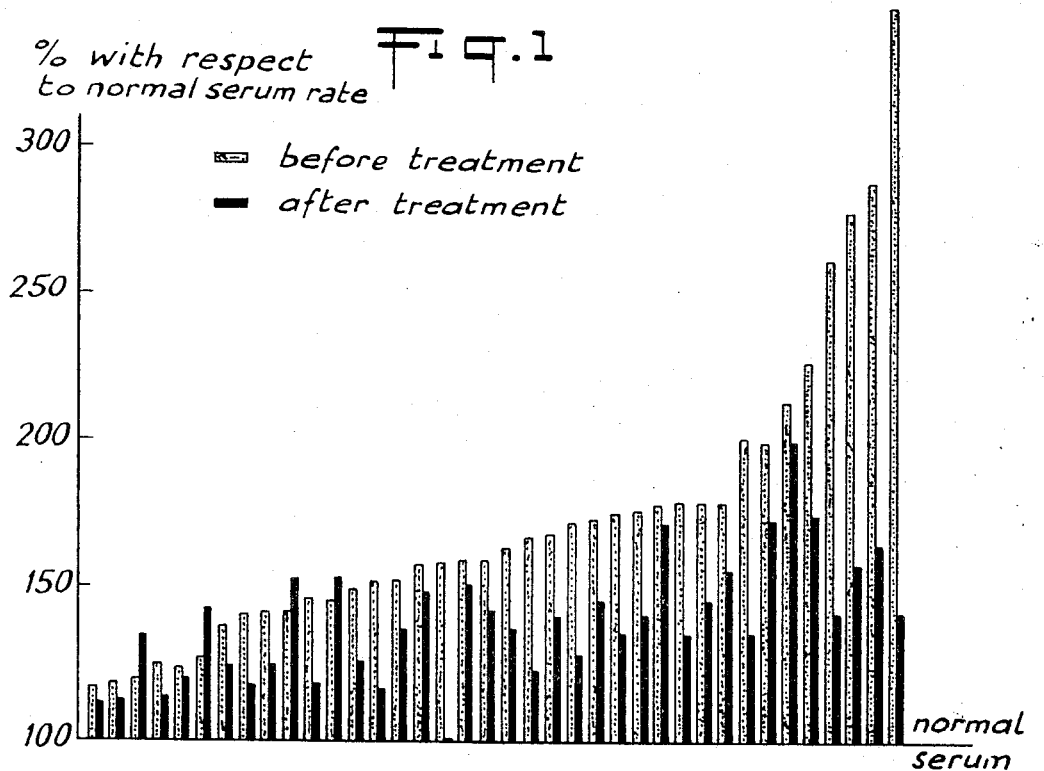

FIG. 1 shows, for 38 cases of atherosclerosis, the following results, expressed as a function of the ratio between the percentages (with respect to the normal serum) of the serum rates, after and before treatment:

13 very good results
7 good
10 fairly good
4 mediocre
4 nil

Figure 2:
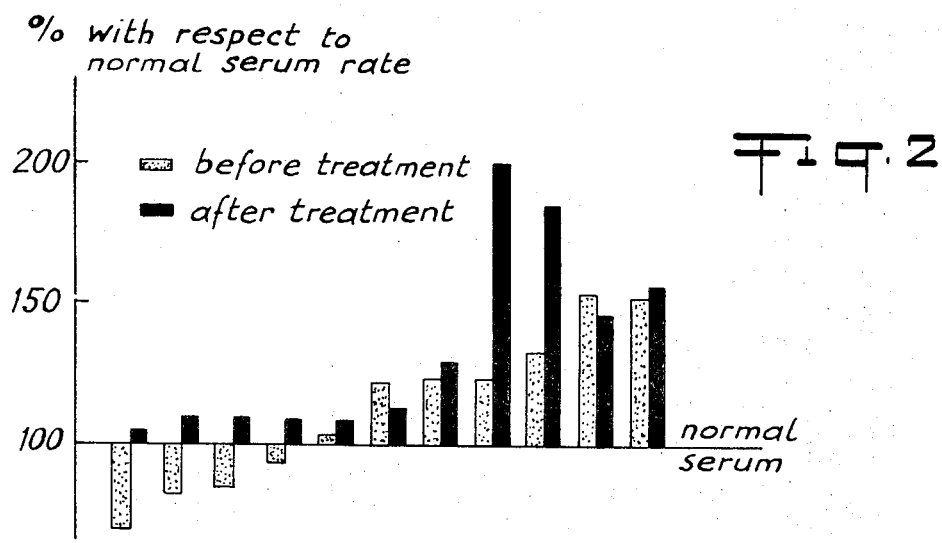
FIG. 2 shows the variations of the rate of elastase in the serum of 11 patients suffering from hemiplegia, coronary insufficiencies or arterial thrombosis.

Concerning the regularization of the rate of elastase (FIG. 2), it was good in 5 cases: mediocre in 1 case, nil in 5 cases.

FIG. 3 shows that, in coronary thrombosis, the rate of antielastase is, after treatment, returned to normal more efficiently in the former cases than in the recent cases; this rate is returned, after treatment, to a value very close to the normal one in two cases out of three of pancreatitis; in the case of diabetes, the following results are observed:

1 very good
2 fairly good
1 mediocre
1 nil.

The pancreas extract of the present invention therefore has an equilibrating role by controlling the elastase-antielastase complex; by the use of this extract it is possible to exert favorable control over arterial hardening.

INDICATIONS

From the results discussed above, the pancreatic extract of the present invention is useful in the following conditions:

In the arterial disease (atheromatosis, arteriosclerosis), whether it be still in the clinically latent stage but already signed by the more or less pronounced lipido-protein humoral syndrome, or whether it be indicated in clinical treatment by visceral vascular attacks (coronaritis and coronary thrombosis, cerebral, renal, ocular attacks) or peripheral attacks (arteritis of the lower limbs) or of the abdominal system (in particular aorta, mesenterics, pancreatic arteries);

In pancreatic ailments, particularly sub-acute and chronic ones, whether they appear primitive or secondary at a regional arteritis;

In not-insulin dependent diabetes.

TABLE I.—ARTERIAL DISEASES

| No. | Name of patient | Diagnosis | Lipoproteins before treatment | | | | Lipoproteins after treatment | | | | Modifications of ratio β/α serum normal=2.4 | | Results |
|---|---|---|---|---|---|---|---|---|---|---|---|---|---|
| | | | Slow (β) | Percent[1] | Rapid (α) | Percent[1] | Slow (β) | Percent[1] | Rapid (α) | Percent[1] | Before treatment | After treatment | |
| 252 | Htd | Francois (47) | Myocardium infarct | 121 | (+) 102 | 24.3 | (−) 2.8 | 53.2 | (−) 10.8 | 38 | (+) 52 | 4.97 | 1.40 | ++ |
| 250 | Gro | Rene (58) | do | 60 | 0 | 23.1 | (−) 7.6 | 69.9 | (+) 16.6 | 31.1 | (+) 24.4 | 2.59 | 2.24 | +++ |
| 207 | Rig | Jean (56) | do | 70.1 | (+) 19 | 26.4 | (+) 5.6 | 55.5 | (−) 7.2 | 29.6 | (+) 18.4 | 2.65 | 1.88 | +++ |
| 283 | Phi | Charles (79) | do | 78 | (+) 30 | 30.3 | (+) 21.2 | 56.6 | (+) 5.6 | 23.4 | (−) 6.4 | 2.41 | 2.41 | +++ |
| 258 | Cha | Eugene (84) | do | 69.6 | (+) 16.2 | 27 | (+) 8 | 66.6 | (+) 11 | 23.4 | (−) 6.4 | 2.57 | 2.84 | +++ |
| 285 | Pau | Marie (84) | do | 66.8 | (+) 13.4 | 34.2 | (+) 36.8 | 66.9 | (+) 14.8 | 29.7 | (+) 18.8 | 1.95 | 2.31 | +++ |
| 233 | Arl | Augustine (76) | do | 98.4 | (+) 64.2 | 29.1 | (+) 16.4 | 67.7 | (+) 12.8 | 25 | (+) 0 | 3.38 | 2.70 | +++ |
| 236 | Fou | Berthe (80) | Formerly hypertensive, admitted to hospital for left-hand hemiplegia by softening. Blood pressure: 20.10. Hypertensive. Blood pressure 20.10. Right-hand hemiplegia for three months. | 120 | (+) 100 | 25.8 | (+) 3.2 | 64.8 | (+) 8 | 21.7 | (−) 13.2 | 4.65 | 2.98 | +++ |
| 230 | Lel | Zelle (86) | Atherosclerosis. Arterial hypertension | 96 | (+) 60 | 66.4 | (+) 165.6 | 70.5 | (+) 17.6 | 26.1 | (+) 4.4 | 1.44 | 2.70 | ++ |
| 108 | Rog | Louis (84) | Atheroma. Parkinson's disease | 69 | (+) 15 | 34.7 | (+) 38.8 | 91.9 | (+) 53.2 | 26.9 | (+) 7.6 | 1.91 | 3.41 | − |
| 206 | Pin | Robert (57) | Coronary insufficiency | 68.4 | (+) 30.8 | 25 | 0 | 70.8 | (+) 18 | 29.4 | (+) 17.6 | 2.73 | 2.40 | +++ |
| 335 | Bal | Eugene (73) | Considerable atheroma. Right-hand carotid obliteration | 87 | (+) 44 | 21.2 | (−) 15.2 | 70.7 | (+) 17.6 | 24.6 | (−) 1.6 | 3.19 | 2.87 | ++ |
| 225 | Cha | Marie (67) | Pseudo-bulbar state by cerebral atherosclerosis | 66.2 | (+) 10.4 | 26.6 | (+) 6.4 | 60 | 0 | 25 | 0 | 3.84 | 2.41 | +++ |
| | Gir | Marie | Undernourished atherosclerous patient, presenting an aphasia of Broca type | 83.1 | (+) 38.4 | 21.6 | (−) 13.6 | 61.9 | (+) 3.2 | 25.6 | (+) 2.4 | 3.84 | 2.41 | ++ |
| 239 | Mes | Maria (80) | Atherosclerosis. Left-hand hemiplegia. Arterial hypertension | 72.9 | (+) 21.6 | 23.6 | (−) 5.6 | 93 | (+) 55.4 | 40.6 | (+) 62.4 | 3.09 | 2.29 | +++ |
| 251 | Dun | Marie (81) | Atherosclerosis | 63.9 | (+) 6.6 | 25 | 0 | 59.1 | (−) 1.6 | 27.7 | (+) 10.8 | 2.55 | 2.13 | ++ |

[1] See the following—Percent of increase (+) or reduction (−) of respectively β-lipoprotein and α-lipoprotein rates, after treatment, with respect to the corresponding rates before treatment.

TABLE II.—ARTERITIS OF THE LOWER LIMBS

| No. | Name of patient | Diagnosis | Lipoproteins before treatment | | | | Lipoproteins after treatment | | | | Modifications of ratio β/α serum normal=2.4 | | Results |
|---|---|---|---|---|---|---|---|---|---|---|---|---|---|
| | | | Slow (β) | Percent[1] | Rapid (α) | Percent[1] | Slow (β) | Percent[1] | Rapid (α) | Percent[1] | Before treatment | After treatment | |
| 248 | Bon... Louise (84) | Arteritis of the lower limbs with intermittent claudication for about 10 years and nocturnal cramps. | 52.4 | (−) 12.6 | 19.3 | (−) 22.8 | 64.9 | (+) 8.2 | 24.3 | (−) 2.8 | 2.71 | 2.67 | ++ |
| 248 | Lee... Jeanne (81) | Arteritis of the lower limbs necessitating an amputation of the left-hand thigh. | 60 | 0 | 21.2 | (−) 15.2 | 58.8 | (−) 2 | 22.6 | (−) 9.6 | 2.83 | 2.60 | ++ |
| 234 | Bon..; Louise (86) | Arteritis of the lower limbs with intermittent claudication after walking 100 meters. Blood pressure: 13.8. | 78.8 | (+) 31.4 | 26.6 | (+) 6.4 | 75.6 | (+) 26 | 28.8 | (+) 15.2 | 2.96 | 2.63 | ++ |
| 173 | Mar... Abram (71) | Arteritis of the lower limbs. Blood pressure 16.13. Left-ventricular insufficiency and renal insufficiency. | 62.7 | (+) 4.6 | 35.2 | (+) 40.8 | 61.4 | (−) 2 | 19 | (−) 24 | 1.78 | 3.11 | − |
| 171 | Suv... Albert (65) | Arteritis of the lower limbs. Arterial hypertension 27.11. Renalinsufficiency | 75 | (+) 25 | 26.4 | (+) 5.6 | 69 | (+) 15 | 25 | 0 | 2.84 | 2.55 | + |
| 353 | Bou... Louis (78) | Arteritis of the lower limbs known for several years. Passed to surgery where he underwent an amputation of the thigh. | 79.9 | (+) 33.2 | 27.3 | (+) 9.2 | 56.9 | (+) 61.6 | 34.6 | (+) 38.4 | 2.92 | 2.80 | ++ |

[1] See footnote at bottom of Table I.

TABLE III.—PANCREATITIS, DIABETES, MISCELLANEOUS

| No. | Name of patient | Diagnosis | Lipoproteins before treatment | | | | Lipoproteins after treatment | | | | Modifications of ratio β/α serum normal=2.4 | | Results |
|---|---|---|---|---|---|---|---|---|---|---|---|---|---|
| | | | Slow (β) | Percent[1] | Rapid (α) | Percent[1] | Slow (β) | Percent[1] | Rapid (α) | Percent[1] | Before treatment | After treatment | |
| | Gue... Marcel (50) | Sub-acute pancreatitis. General state mediocre, asthenia, anorexia, loss of weight of from 3 to 4 kg. | 53.1 | (−) 11.2 | 25.9 | (+) 3.6 | 60 | 0 | 29.8 | (+) 19.2 | 2.05 | 2.01 | ± |
| | Mic... Rene (31) | Duodeno-cephalic pancreatectomy in 1965. Return, for lowering of the general state, loss of appetite, loss of weight. | 54.1 | (−) 9.6 | 14.4 | (−) 42.4 | 55.6 | 7.2 | 17 | 32 | 3.76 | 3.28 | +++ |
| 245 | The... Georges (30) | Outbreak of chronic pancreatitis | 78.6 | (+) 31 | 25 | 0 | 54.4 | (−) 9.2 | 20.8 | (−) 16.8 | 3.14 | 2.61 | ++ |
| 135 | Cle... Joelle (17) | Outbreak of insuline diabetitis | 60 | 0 | 19.4 | (−) 22.4 | 50.1 | (−) 16.4 | 23.2 | (+) 7.2 | 3.09 | 2.16 | ++ |
| 382 | Ami... Paul (60) | Myeloid leukemia treated by corticotherapy in a diabetic subject not hitherto treated with insulin. | 55.2 | (−) 6 | 25 | 0 | 42.2 | (−) 29.6 | 28.1 | (−) 7.6 | 2.21 | 1.79 | − |
| 286 | Rou... (71) | Prediabetic state. Angina pectoris. Diffuse atherosclerosis. Arterial hypertension. | 69.9 | (+) 16.4 | 21.8 | (−) 12.8 | 59.1 | (−) 1.6 | 22.2 | (−) 11.2 | 3.20 | 2.66 | +++ |
| 272 | Lel... Gisele (21) | Obesity (124 kg.) | 51.2 | (−) 14.6 | 13.8 | (−) 44.8 | 57.1 | (+) 4.8 | 29.3 | (+) 18.8 | 3.71 | 1.95 | +++ |
| 226 | Chou... Marcelle (49) | Xanthelasma | 67.2 | (+) 12 | 23.3 | (−) 6.8 | 63.2 | (+) 5.4 | 21.8 | (−) 13.2 | 2.88 | 2.89 | + |

[1] See footnote at bottom of Table I.

I claim:

1. A process for the preparation of extracts of the pancreas, useful in opotherapy, which comprises the steps:
(a) collecting the pancreas aseptically immediately upon slaughtering the animal;
(b) removing from said pancreas foreign matter, debris and fat;
(c) freezing the pancreas by immediately placing said pancreas in a medium at a temperature of about −78° C. and then maintaining the pancreas at a temperature of about −20° C.;
(d) crushing the pancreas at a temperature of about 2° C.
(e) subjecting the crushed pancreas to moderate digestion at room temperature by activated trypsin;
(f) removing insoluble matter from the resulting material to leave a clear solution;
(g) removing euglobulins present in said solution by affixing on an insoluble sulfate;
(h) removing the insoluble sulfate and clarifying the resulting solution; and
(i) freeze-drying said clarified solution by immediately placing it in a medium at a temperature of about −80° C.

2. A process according to claim 1 wherein step (g) is carried out by:
(a) lowering the pH of the clarified solution to about 3.7 by the addition of sulfuric acid;
(b) raising the pH of the solution to about 9 by adding an alkaline earth hydroxide selected from the group consisting of calcium and barium hydroxides; and
(c) lowering the pH to about 3.7 by the addition of sulfuric acid.

3. A process according to claim 2 wherein the trypsin is activated with calcium ions.

References Cited
UNITED STATES PATENTS
3,676,551   7/1972   Thuillier   424—103
FOREIGN PATENTS
1,267,101   6/1961   France   424—110

RICHARD L. HUFF, Primary Examiner